United States Patent [19]

Tsumura

[11] Patent Number: 5,729,740
[45] Date of Patent: Mar. 17, 1998

[54] INFORMATION SERVICE BILLING SYSTEM USING RADIO COMMUNICATIONS

[75] Inventor: Mihoji Tsumura, Osaka, Japan

[73] Assignee: Ricos Co., Ltd., Japan

[21] Appl. No.: 163,933

[22] Filed: Dec. 8, 1993

[30] Foreign Application Priority Data

| Dec. 10, 1992 | [JP] | Japan | 4-352932 |
| Dec. 25, 1992 | [JP] | Japan | 4-358308 |
| Mar. 3, 1993 | [JP] | Japan | 5-069337 |
| Mar. 26, 1993 | [JP] | Japan | 5-092072 |
| Mar. 26, 1993 | [JP] | Japan | 5-092073 |

[51] Int. Cl.$^6$ .................................................. G06F 17/30
[52] U.S. Cl. .................................................. 395/615; 395/201
[58] Field of Search .................. 340/870.02, 870.03, 340/870.05, 870.07; 358/86, 84, 142; 379/105–107; 364/483

[56] References Cited

U.S. PATENT DOCUMENTS

| 4,163,254 | 7/1979 | Block | 358/122 |
| 4,586,078 | 4/1986 | Cuta et al. | 358/86 |
| 4,710,955 | 12/1987 | Kaufman | 380/10 |
| 4,796,297 | 1/1989 | Okamoto | 380/10 |
| 4,928,177 | 5/1990 | Martinez | 358/142 |
| 4,940,976 | 7/1990 | Gastouniots et al. | 340/870.02 |

FOREIGN PATENT DOCUMENTS

| 0450841 | 10/1991 | European Pat. Off. | H04N 7/16 |
| 0180460 | 5/1986 | Japan | H04N 7/16 |
| 0279608 | 8/1988 | Japan | H04N 7/173 |

OTHER PUBLICATIONS

16th Inter'l TV Symposium Jun. 1989 Montreaux Switzerland pp. 524–535.
R. Kochan "Value–Added Services and Functions for MATV & CATV System".

Primary Examiner—Thomas G. Black
Assistant Examiner—Diane D. Mizrahi
Attorney, Agent, or Firm—Thompson Hine & Flory LLP

[57] ABSTRACT

An efficient billing system for value-added information. The present invention provides an efficient billing system in which an information provider, can bill an information service fee in an efficient manner when the receiving device of a user receives toll information via radio communications, typically satellite communications. The present invention essentially comprises a main unit at a transmitter side having a host computer with a database for storing data of various types and a transmitter for radio communications, and a plurality of terminal units for receiving said various types of data. Each data frame of various data types transmitted from the main unit has a data identification code identifying the corresponding data type. The terminal unit stores utilization status data which are processed, and executed. The utilization status data singly or in combination with public utilities rate data are fed back to the main unit. Alternatively, information service fee is added onto the public utilities rate before they are billed.

10 Claims, 9 Drawing Sheets

| a | b | c | d | e | f |
|---|---|---|---|---|---|

FIG. 8

INFORMATION SERVICE BILLING SYSTEM USING RADIO COMMUNICATIONS

BACKGROUND OF THE INVENTION

1. Field of the Invention

The present invention is directed to technical arrangements which provide the efficient billing system of service rate on an individual-piece-of-information basis or on a unit-of-information basis in a variety of information service ranging from music to video to text including news by means of radio communications, particularly by satellite communications. The present invention is also directed to the billing system for public utilities rates.

2. Description of the Prior Art

Radio broadcasting, television broadcasting, and satellite communications using communications satellites are now in widespread use. Billing service fees and then collecting them in a timely manner are the major problem associated with radio communications, because radio communications are not provided with the comparable System that is normally used by telephone lines where communications are performed on the basis of handshake under the control of telephone exchanges. In television broadcasting, it is common and established practice to bill and collect fees on each television set based on the assumption that concerned channels are selected and watched on the television set by viewers or users since it was installed. There are some systems, now in use, of satellite broadcasting service, in which signals are scrambled before transmission, and the user terminal is equipped with a de-scrambler which de-scrambles the received signal. In this case, a predetermined monthly rate of fee is billed.

The first system described above, however, suffers poor performance in collecting information service fees, because payment of the fees is entirely dependent on the user's own will. The second system of using a de-scrambler puts the burden of installing the de-scrambler on the receiver, incurring extra cost on him. This can restrict the commercial expansion of the number of subscribers.

The conventional fee systems are generally a fixed amount fee per month system, which does not allow fees to be flexibly set depending on type of information and does not allow fees to be paid at a flexible timing. This prevents the information provider from intensively broadcasting costly piece of information only, from the commercial point of view. If the information provider do limit the broadcasting of popular information or programs, no commercial expansion in subscription is expected.

Those who particularly need information management for each individual customer are public utilities such as electricity, gas and water services. Every household and office essentially requires water and energy supply such as gas and electricity. Public utilities rates for these items are now collected separately on an individual basis. An information provider may efficiently perform fee collection if the information service fee mentioned above is added to the utility rate of any item and then they are collected together. Such an efficient fee collection system may allow the information provider to get cost return for an investment as scheduled. With fees collected as scheduled, the information provider may have a good chance of scheduling operation of his capital which may be invested further to provide even more value-added information to subscribers.

In its preset form of fee collection system for public utility service, each consumer is equipped with a utility meter which indicates how much electricity, gas or water has been consumed. The consumer pays for the amount indicated. More specifically, a public utilities company periodically reads the meter of each consumer for the difference between the current reading and the previous reading, and bills the charge corresponding to the difference to each consumer. In this case, a reader must go to each consumer's place for reading meters one by one.

In present day environment in which a vast amount of information is now exchanged in a fast and accurate manner by electronic telecommunications means, the reading of utility meters, that is used as a basis for fee calculation, may not necessarily entirely dependent on readers. In other words, public utilities companies may not need a number of readers dedicated to meter reading operation, may save time and cost required for the operation, and may save a vast amount of personnel expenses. This may help restrict price rising of public utilities service, leading to economical benefit to every consumer.

SUMMARY OF THE INVENTION

It is a first object of the present invention to provide a billing system which allows proper billing on the basis of the frequency of access for information and unit prices of individual pieces of information a user receives, with a monthly fee system not necessarily being used.

It is a second object of the present invention to provide a billing system in which an information service fee is added onto the public utilities rate of any of water, electricity and gas supplies and the summed amount is billed and collected in an assured manner.

It is another object of the present invention to provide a billing system in which, contrary to the manner employed in the second object, any item of public utilities rates is added onto the information service fee, and the summed amount is billed and collected, wherein the billing system is an integrated system covering a plurality of service types which a user or consumer has used.

To achieve the above objects, the present invention essentially comprises main unit made up of a host computer for storing various types of data and a transceiver unit for radio link, and a plurality of terminal units for receiving the various types of data, wherein the main unit transmits each of the various types of data tagged with its unique data identification code; each of the plurality of terminal units, having its own unique terminal identification code, stores sequentially all data identification codes of the data read into the terminal unit out of the data transmitted from the main unit, and, receiving the control signal which the main unit transmits at regular intervals to request the transfer of utilization status information, each of the plurality of the terminal units forms data streams comprising stored data identification codes, each including terminal identification code.

In another aspect, the present invention comprises a main unit, equipped with a database of toll value-added information, transmits a requested information retrieved from the database in response to a request of any of a plurality of terminal units, and the plurality of terminal units which receive the toll value-added information sent in response to their own requests and then perform required processing, wherein the main unit has an input port in a request receiver block to which a telephone line is directly coupled, and further comprises an acting value-added information service billing line; the plurality of terminal units have their own unique terminal identification codes, value-added information transmitted from the main unit includes the terminal identification code of a requesting terminal unit, and fee information corresponding to the value-added information transmitted, the requesting terminal unit, after completion of processing the received value-added information, sends the fee information to the main unit via the telephone line, and the main unit connects the input port to the acting value-added billing line for a duration of time according to the fee information received.

In yet another aspect, the present invention comprises main unit made up of a host computer for storing data of various types and a transceiver unit for radio link, and a plurality of terminal units for receiving the data of various types, wherein the main unit transmits each data tagged with its unique data identification code; each of the plurality of terminal units is provided with a utilization status counter for storing data identification codes of data actually used; the terminal unit calculates service fee based on the stored data identification codes in the utilization status counter referring to fee conversion data which the main unit transmits at regular intervals; the service fee information is sent to a fee conversion adaptor connected to the terminal unit, the signal provided from the adaptor is used to control the meter which indicates the public utilities rate of, typically, the consumption Of any one of electricity, gas and water supplies.

In a further aspect, the present invention comprises main unit made up of a host computer for storing various types of data and a transceiver unit for radio link, and a plurality of terminal units for receiving the various types of data, wherein the main unit is coupled to the plurality of terminal units via both a radio link and a telephone line; each of the plurality of terminal units is provided with a digital meter which measures consumption of one or more types of public utilities services, typically electricity, gas and water supplies, and further provided with a memory for storing a consumed amount as consumption data; each of the plurality of terminal units is provided with means which uploads the consumption data stored in the memory to the main unit via the telephone line in response to a control signal which the main unit transmits as a satellite signal; and each of the plurality of terminal units is provided with delay means which determines the timing at which each of the plurality of terminal units accesses the main unit and each delay means provides different delay time constant.

BRIEF DESCRIPTION OF THE DRAWINGS

FIG. 8 shows the data structure according to the third embodiment of the present invention.

DETAILED DESCRIPTION OF THE PREFERRED EMBODIMENT

Figure 1:
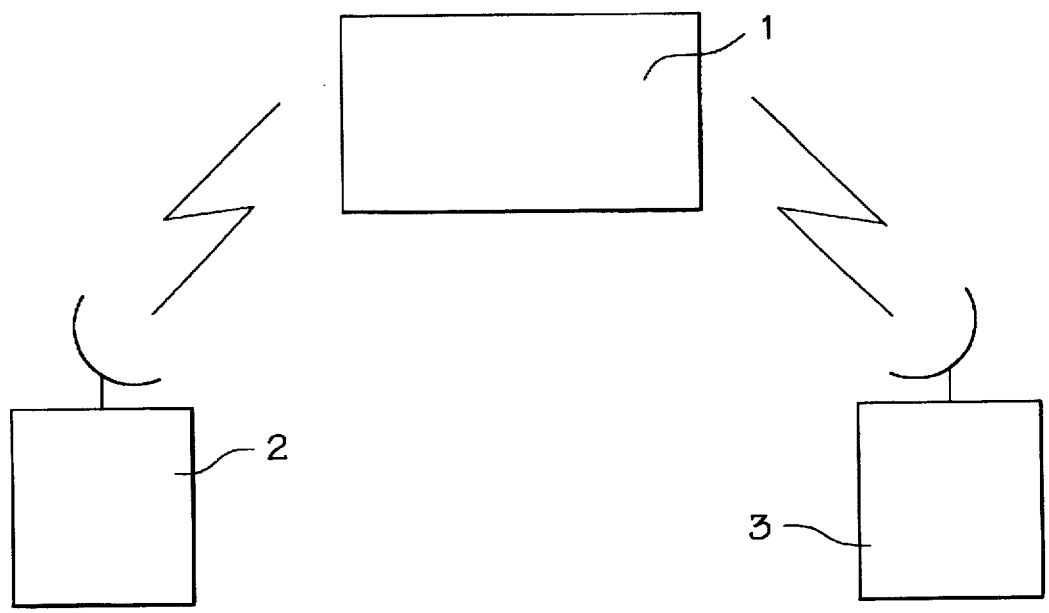
FIG. 1 is a block diagram showing generally the present invention.
Figure 2:
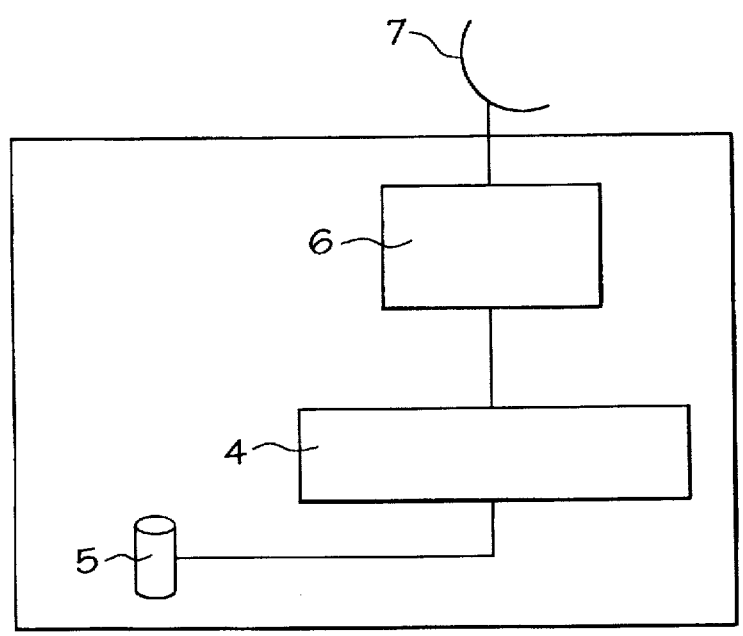
FIG. 2 is a block diagram showing the main unit of the present invention.

Referring now to the drawings, embodiments of the present invention are discussed below. FIG. 1 is a block diagram showing the first embodiment of the present invention, wherein satellite communications are here employed. The first embodiment of the present invention comprises a communications satellite 1 at a determined orbit, main unit 2 at the transmitter side functioning as a host station, and a receiving terminal unit 3 provided for each user. Although a single terminal unit 3 is shown in FIG. 1, a plurality of terminal units, in practice, may be provided in a parallel configuration. As shown in FIG. 2, the main unit 2 essentially comprises a host computer 4, a database 5 under the control of the host computer 4, a transmitter 6, and an antenna 7 for satellite communications. A multichannel broadcasting is possible by setting up a plurality of channels if the transponder of the satellite 1 is fully made use of. In this case, the main unit 2 assigns different types of information to different channels, and transmits multichannel signals to the communications satellite variety of information may be assigned to the plurality of channels. For example, in karaoke music, a tune is assigned to one channel, with its associated words assigned to another; and in computer video game, data and programs are assigned to separate channels. In these examples, the user is afforded a choice of which channel to select.

Figure 3:
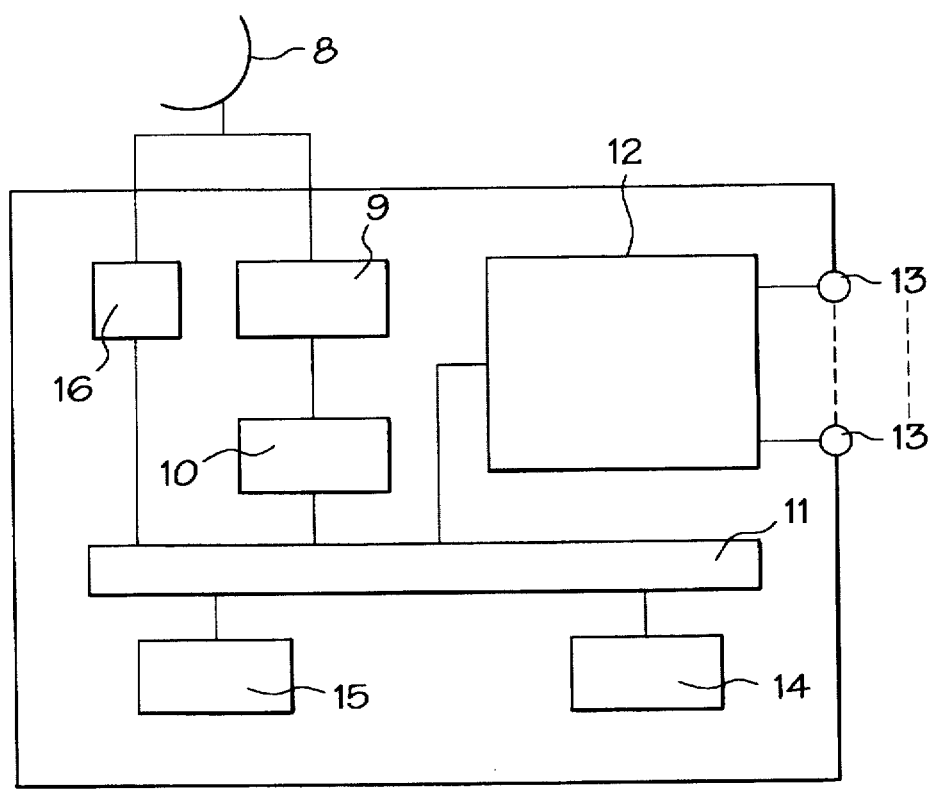
FIG. 3 is a block diagram showing the terminal unit of the present invention.

Referring now to FIG. 3, the construction of the terminal unit 3 is detailed below. Via an receiving/transmitting antenna 8, a tuner 9 receives satellite signals derived from the main unit 2. Signals to be transmitted can be image data such as video signals, and digital signals such as data required for the operation of karaoke or computer video games. It is assumed that the tuner 9 has a structure capable of receiving simultaneously a plurality of channels. A received data processing block 10, having memory means such as a buffer memory, saves temporarily each data when multichannel signals are simultaneously processed, and processes data streams, such as headers and footers, which are used for communication. Furthermore, the received data processing block 10 performs essential processing functions such as de-scrambling the received data and extracting required information if the received data are scrambled. A control CPU 11 controls the entire terminal unit. A signal processing block 12 comprises, in a parallel configuration, a video signal processing circuit, a karaoke signal processing circuit, and video game signal processing circuit, with each circuit processing the corresponding type of received signal. The signal processing circuits have respective output terminals 13 as many as required. To pick up the video output, a display unit is simply connected to the video output terminal. To enjoy computer video games, a video game machine is simply connected to the video game output terminal. A control panel and a display panel are designated 14 and 15, respectively. Keys disposed on the control panel 14 are manipulated to select desired information referring to an information listing presented on the display panel 15. A transmitter 16 sends the data regarding the information service which the terminal unit 3 has received, from the terminal unit 3 toward the main unit 2. A radiowave bearing the data is transmitted through the antenna 8 of the transmitter 16.

Described below is the operation of the billing system for toll information service which are exchanged between the main unit 2 and the terminal unit 3. Each terminal unit has its own unique terminal identification code (ID). The main unit 2 transmits various types of information (data) on different channels. Each data the main unit 2 transmits contains its unique data identification code. When the terminal unit 3 receives the data and processes them, CPU 11 or the memory block (not shown) under the control of CPU 11 stores the utilization information. Next, the main unit 2 transmits to the terminal unit 3 at regular intervals a control signal to request the sending of utilization information. Upon receiving the control signal, the terminal unit 3 constructs the utilization information, such as data identification codes, that has stored since the penultimate control signal, into data streams, by adding a header and a footer to each data stream, and then transmits the data stream to the main unit 2. In this case, the terminal ID unique to each terminal unit is included as additional information in the data stream. Receiving the data stream from the terminal unit, the main unit 2 recognizes the ID, and performs required processing to the utilization information on a per ID basis to calculate service fee at regular intervals.

Several methods are available to calculate service fee from utilization status information, and which method to use is arbitrarily at the option. In a first method, the utilization information contains data indicative the frequency of utilization per data identification code based on the data identification code information, the main unit 2 stores, as a data table, a service fee pricing table itemized by each data identification code, and the main unit 2 determines the sum referring to the data table. In a second method, each terminal unit 3 performs service fee calculation. Each terminal unit 3 stores a data table identical to the one in the main unit in the first method, refers to the data table in response to a control signal received from the main unit 2 to sum service fee, and sends the data indicative of the resulting sum. The second method provides to the user a convenience which allows the user to monitor utilization status by checking summed service fee. This embodiment is exemplified in satellite communications. Alternatively, however, other radio communications such as FM radio communications may replace satellite communications without any modification in essential system configuration of the embodiment.

In the first embodiment, the main unit 2 offers an immediate monitoring of the utilization status of each terminal unit, and no manual intervention is required in the calculation of service fee. If summed service fee is output in hardcopy in a proper bill format, that bill format may be directly used as an actual bill, leading the saving of cost and labor involved in the issue of bills. It is also contemplated that the utilization status information of each terminal unit is uploaded via a telephone line rather than via a radio link. This may occupy partly the operation time that would be otherwise entirely available for normal telephone service. If the efficiency problem in traffic is not very important, however, there are no other major problems against the use of the telephone line.

Figure 4:
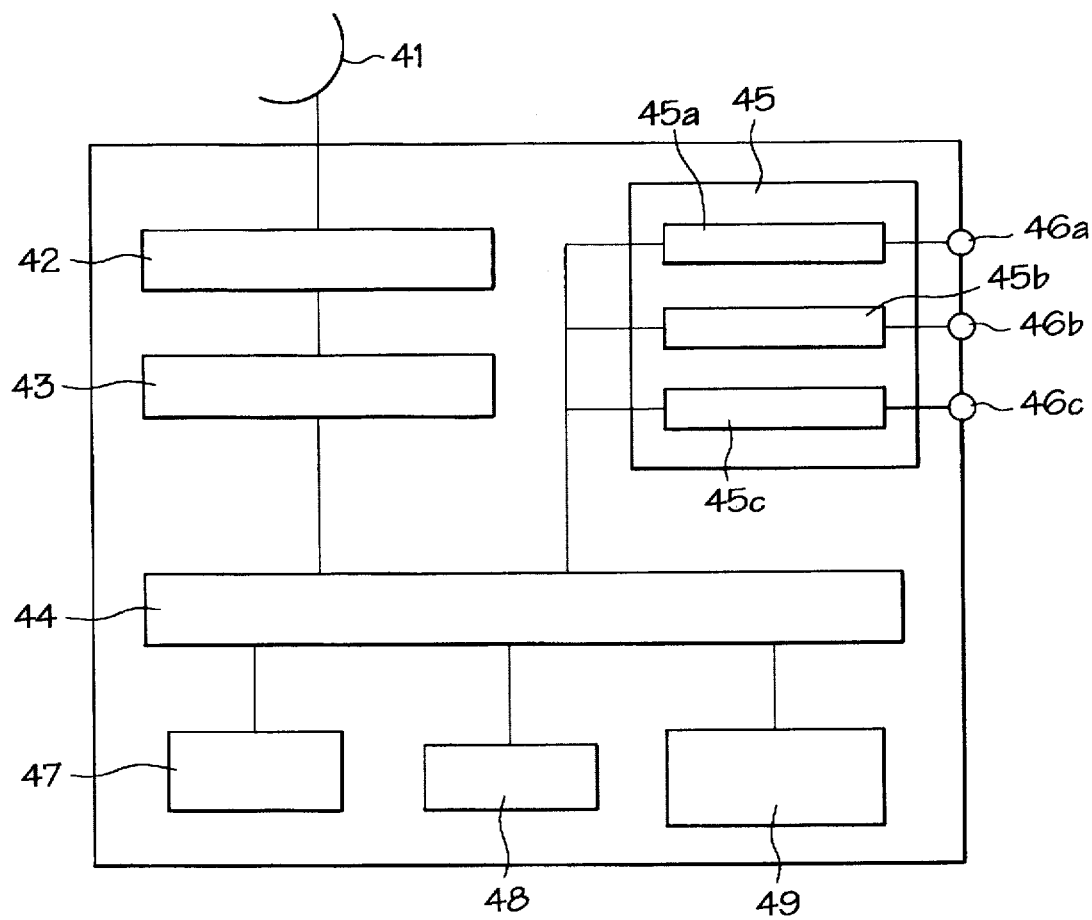
FIG. 4 is a block diagram showing the terminal unit according to the second embodiment of the present invention.

Next, the second embodiment of the present invention for efficient billing of information service fee will be discussed below. The essential configuration of the second embodiment is identical to that shown in FIG. 1. The structure of the main unit is identical to that of FIG. 2. The configuration of the terminal unit is shown in FIG. 4. In the figure, a tuner 42 connected to a receiving antenna 41 is a device to receive the signal (data) transmitted from the main unit 2. It is assumed that data to be transmitted can be digitized data such as those of video, karaoke and video game. A digital data processing block, indicated at 43, comprising a buffer memory and the like, decodes the satellite signal provided by the tuner 42 into a valid digital signal, processes the headers and footers which have been used for communications, and extracts required information from data streams. A control CPU 44 controls the entire terminal unit. A signal processing block 45 comprises, in a parallel configuration, a digital video signal processing circuit 45a, a digital karaoke signal processing circuit 45b, and a digital video game signal processing circuit 45c, with each circuit processing the corresponding type of received signal. The signal processing circuits have respective output terminals 46a, 46b and 46c. To pick up the video output, a display unit is simply connected to the video output terminal. To enjoy computer video games, a video game machine is simply connected to the video game output terminal. A control panel and a display panel are designated 47 and 48, respectively. Keys and buttons disposed on the control panel 47 are manipulated to select desired information referring to an information listing presented on the display panel 48. The above configuration remains essentially unchanged from the first embodiment in FIG. 3, except that the first embodiment is provided with the transmitter 16 used for transmission from the terminal unit 3 to the main unit 2. No transmitter is included in the terminal unit in the second embodiment.

Figure 5:
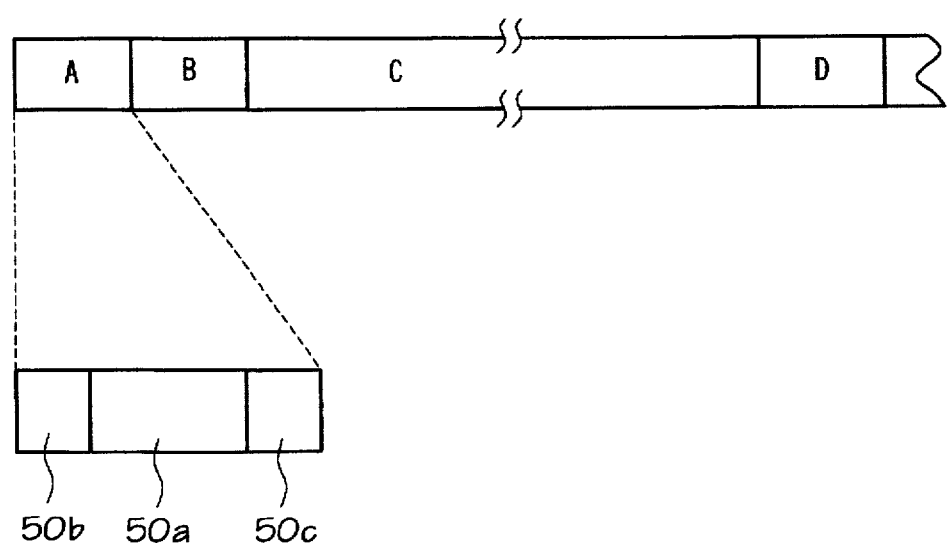
FIG. 5 shows the structure of data transmitted and received in the second embodiment of the present invention.

Next, the operation of the billing system of information service fee is discussed in FIG. 4, a utilization status memory 49 counts the use of each signal processing block 45 and stores the total count per signal processing circuit. Total service fee per any desired period of time is calculated based on the stored count of utilization. Each frame of digital data contains data identification code corresponding to the type of information. The structure of data frame is described referring to FIG. 5. It is assumed that a single channel handles digital data formed of information types A through D. Information type A is sound data, B video game data, C image data, and D karaoke data. The image data C includes digitized video data. Each data consists of a data body 50a, a header 50b and a footer 50c. The header 50b contains a data identification code, as pricing information, as well as control information. Each data identification code indicates whether the service of the data is chargeable by unit of data or by unit of time. For example, in a data type having a relatively small amount of data, typically video game data, reading the entire data at a time and then processing it in a receiver side are not only an easy process but also an essential requirement, because of the structure of the data. Thus, the service fee may be priced by unit of data, and the corresponding data identification code is added. On the other hand, in a data type having a vast amount of data, typically image data, reading the entire data at a time and then processing it result in a poor efficiency. Thus, data streams has a structure such that an automatic interrupt such as the suspension of execution is allowed. The service fee is priced by time, and thus the corresponding data identification code is added. The data identification code described above is judged by the digital data processing block 43, and the utilization status memory 49 stores the data identification codes of the data, which are processed by the control CPU 44, out of all the received data. This storage is performed separately on a per data type basis. Once the information service fee is calculated, for example, based on the fee conversion data from the main unit, the information service fee data may be uploaded to the main unit via a telephone line, and the main unit may bill the total fee at regular intervals. For payment of information service fee, IC cards such as a pre-paid card may be employed at the terminal unit. Payment method is not very important in the context of the present invention.

Digitized data of various types of information are exchanged in the second embodiment as described above. With the aid of computers, a sender side (an information provider) can relatively easily control and transmit in a digital form a medium containing a vast amount of information, such as image data, thereby achieving fast and high-quality communications. A receiver side (a user of information service) can process and execute the received data at a high speed, and benefits from many applications of the received data. Transmitted signal is associated with data identification code to identify the type of data, and the utilization status memory provided in the terminal unit stores the data identification codes of the data, which have been actually used, out of all the received data. Thus, the present invention provides an efficient billing system in which the information provider can bill the information service fee accurately in agreement with the information service actually given to a user who in turn can pay accordingly.

Figure 6:
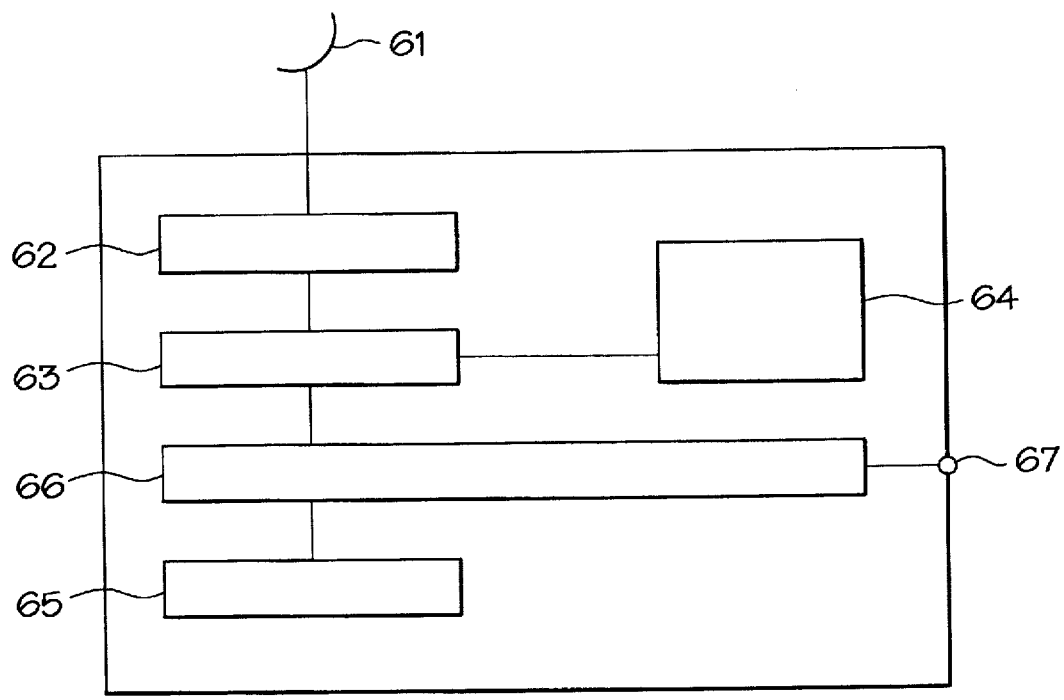
FIG. 6 is a block diagram showing the terminal unit according to the third embodiment of the present invention.
Figure 7:
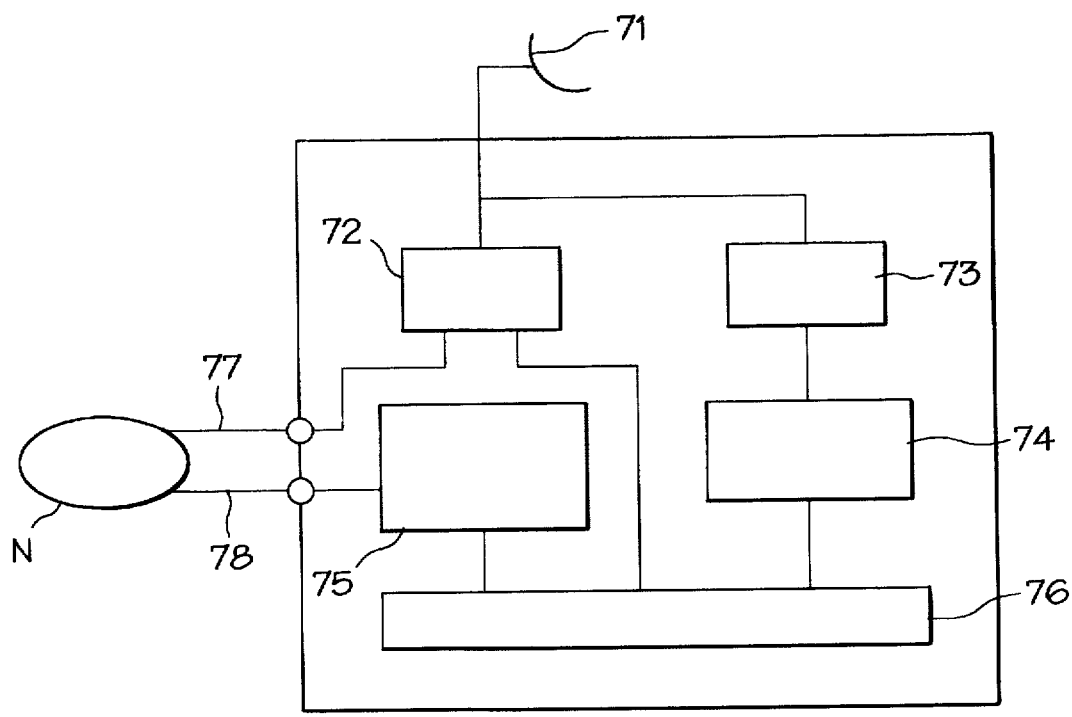
FIG. 7 is a block diagram showing the main unit according to the third embodiment of the present invention.

Discussed next is the third embodiment of the present invention. FIG. 6 is a block diagram of a user device, namely, a terminal unit. The terminal unit comprises a transmitting/receiving antenna 61, a transceiver block 62 for satellite signals, an analyzing block 63 of satellite signals, a buffer memory 64 for storing temporarily data to be transmitted or received, a memory block 65 of transmitted data and received data, and a control CPU 66 for controlling the entire unit to perform required processing to data. An output port 67 is used to couple with external devices. Referring to FIG. 7, the configuration of the main unit working as a host station is described below. The main unit comprises a transmitting/receiving antenna 71 for the host station, a receiver block 72 for receiving signals from the terminal unit, a transmitter block 73 for transmitting control signal as well as transmitting information the terminal unit requests, a database 74 for storing user information and information to be supplied to the terminal unit, an acting billing processing block 75 for billing the information service fee for value-added information via a public telephone line, based on the fee information sent from the terminal unit of each user, and a CPU 76 for controlling each block of the host station. The host station is linked to an acting value-added billing network N owned by a public telephone company. Also shown in the figure are a normal telephone line 77 and an acting value-added billing line 78. In this application, the acting value-added billing is defined as the manner in which when a user calls a host station as an information provider at a particular telephone number, information service fee on a unit of time basis is added to normal telephone line fee while the line is connected, and the telephone office has responsibility for collecting the summed fee. If the terminal unit in FIG. 6 is of a type which is capable of receiving a plurality of data types, it may include a plurality of signal processing circuits arranged in a parallel configuration.

Figure 8:
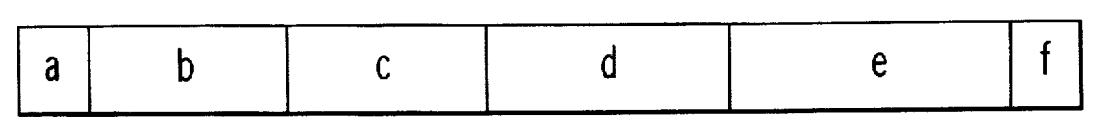

In order for the host station to collect the information service fee from the terminal unit of a user in the system described above, the host station must first register its own acting value-added billing line 78 at the telephone office, and gets an authorized number. When the terminal unit requests toll information stored in the database by sending a data identification code to the host station, the host station verifies the data identification code and then transmits requested information to the main unit according to a predetermined communication protocol. FIG. 8 shows an example of the structure of the transmitted data. The data includes a header a, followed by terminal address information b including terminal ID, data type information c including data type information identifying the type of transmitted data, and information service fee, a body of data d, an error correcting code e and a footer f. As seen from the data structure, packet communication, in principle, is used to prevent error in data transfer. Receiving the data, the terminal unit matches the terminal address information c against its own ID. Any packet having a match is received and processed by the control CPU 66. The satellite signal analyzing block 63 skips in its reading operation any packet having no match with own ID, thereby avoiding unauthorized use of information service.

When the terminal unit has received data in sound state without disturbance on them, the terminal unit transmits the information service fee data of the data type information c to the host station. Receiving the information service fee data from the terminal unit at its receiver block 72, the host station connects the input port to the telephone line to call the acting value-added billing line 78 with which the host station has been registered. It should be noted that the information service fee is billed as per the duration in which the input port remains connected to the acting value-added billing line 78. Either the host station or the terminal unit translates the information service fee into time, and during the resulting time the acting value-added billing line 78 is connected. The telephone line 77 is considered as the telephone line which is utilized by the terminal unit, since the input port is released according to the received data from the terminal unit. In this embodiment, a billing operation is performed each time the terminal unit requests toll information service. Alternatively, for convenience, the terminal unit may upload the information service fee data to the host station at regular intervals.

In the third embodiment, the host station performs billing operation based on the data received from the terminal unit after verifying that the terminal unit has received valid data of toll information, rather than when the transfer of the toll information to the terminal unit is completed. This is for communications security reasons. By basing billing on the information derived from the terminal unit, potential problems in connection with fee calculations are avoided. The system of the third embodiment allows the information service fee billing operation to be performed with the terminal unit playing a major part in process with the aid of satellite bidirectional communications. Thus, problems involved in fee calculations are greatly reduced, compared with the system in which the host station calculates information service fee. Furthermore, since the telephone office functions as an agency for billing and collecting information service fee, the host station is freed from billing operation. Thus, efficient information providing results. Since telephone line are required only between the host station and a regional telephone office in charge, this system is readily installed to a place where there has been difficulty installing a telephone line. This system can thus expand the toll information service of various types.

Figure 9:
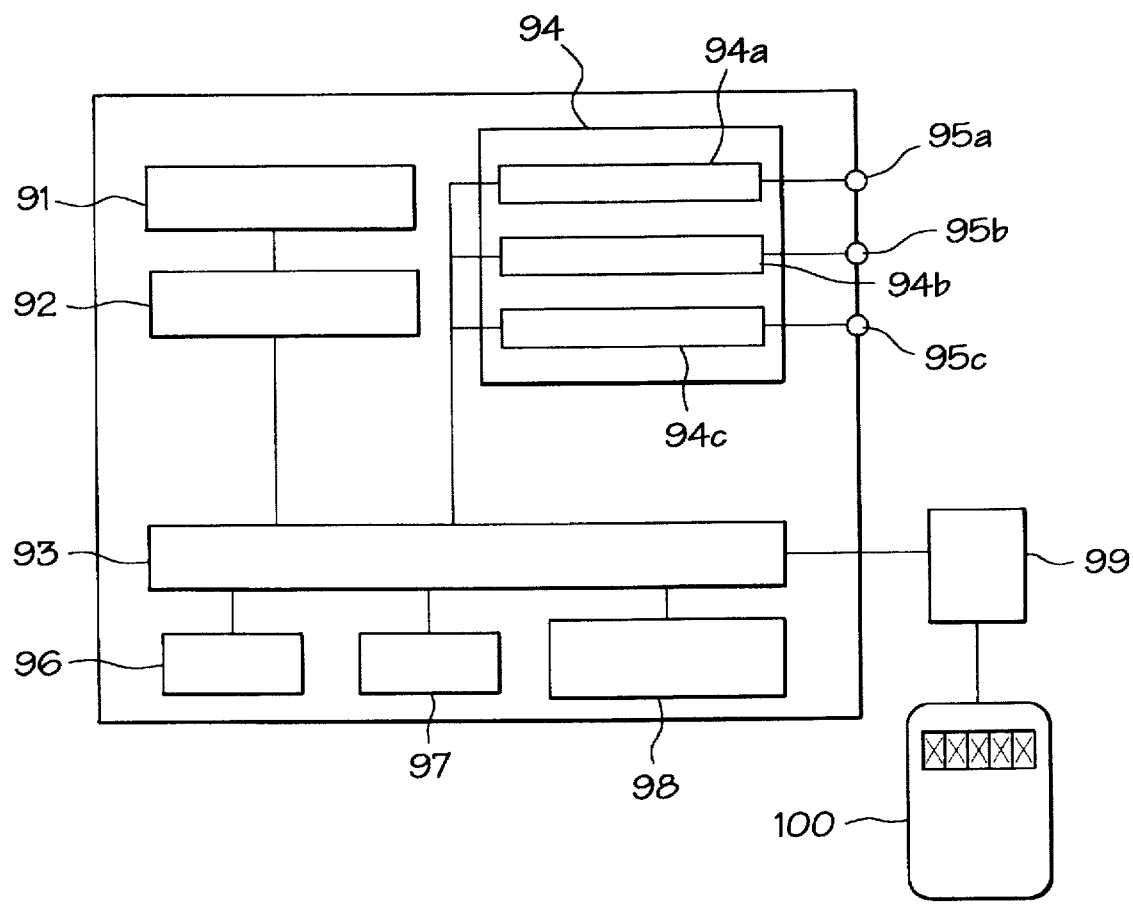
FIG. 9 is a block diagram showing the terminal unit according to the fourth embodiment of the present invention.

In the systems described above, the fee of value added information is singly billed. The inventors are now disclosing the fourth embodiment in which the information service fee is integrated into the public utilities rate system of electricity, gas, water supplies and the like, and the total sum is billed and collected. The system in this embodiment uses the essential configuration shown in FIG. 1, wherein a main unit communicates with each terminal unit via a satellite. Different from the counterpart in preceding systems is the terminal unit possibly installed at home. FIG. 9 shows the terminal unit. A tuner, indicated at 91, is a device for receiving the signal transmitted from the main unit 2. Although no antenna is shown in FIG. 9, an antenna is required if satellite communications are employed. Like the preceding embodiments, signal to be transmitted may be in the form of video signal when image data are handled, and in the form of digital signal when karaoke or video game data are handled. A tuner 91 is capable of receiving simultaneously a plurality of channels. A received data processing block 92 having a buffer memory performs essential functions, such as saving temporarily each data when multichannel signals are simultaneously received, processing data streams including headers and footers, and extracting required information from the received data. A control CPU 93 controls the entire terminal unit. A signal processing block 94 comprises, in a parallel configuration, a video signal processing circuit 94a, a karaoke signal processing circuit 94b, and video game signal processing circuit 94c, with each circuit processing the corresponding type of received signal. The signal processing circuits have respective output terminals 95a, 95b, and 95c. A control panel and a display panel are designated 96 and 97, respectively. Keys disposed on the control panel 96 are manipulated to select desired information referring to an information listing presented on the display panel 97.

The operation of the billing system according to the fourth embodiment is now described. In FIG. 9, a utilization status counter 98 counts the use of each signal processing block 94 and stores the total count per signal processing circuit. Information service fee is calculated based on the stored count of utilization, according to the fee conversion data transmitted from the main unit 2 at regular intervals. The data on which the count of utilization is based (namely, the data identification codes used to count the utilizations of each processing circuit) are inserted into the signal to be transmitted by the main unit. For example, each data frame contains the data identification code corresponding to the type of data. Data output by the tuner 91 are processed by the control CPU93, and the data the control panel 96 selects is then further processed by the corresponding processing circuit of 94a through 94c. The utilization status counter 98 stores the total number per data identification code as the number of utilization data. When for example, for a certain period of time, karaoke was used N times and video game was enjoyed M times, the utilization status counter 98 stores, as frequency of utilization data, karaoke N, video game M. In addition, the stored data identification codes and the fee conversion data regularly transmitted from the transmitter side are cross-referenced on a data table to determine the information service fee at regular intervals.

The information service fee is determined by the utilization status counter 98. As soon as the information service is determined, it is sent, in the form of digital signal, to a fee conversion adaptor 99. The fee conversion adaptor 99 is connected to an AC watthour meter 100 to control it. A household integrating wattmeter in widespread use is an AC integrating wattmeter which employs the induction of shifting magnetic field. An integrating wattmeter is typically made of an aluminum disk, potential and current coils, and a counting device. The aluminum disk rotates at a speed proportional to the product of the magnetic flux of the potential coil and the magnetic flux of the current coil, with both coils connected to a network to be measured. Watthour is measured by counting the number of revolutions of the aluminum disk. Thus, the wattmeter is an analog machine. In this embodiment, to control such a conventional integrating wattmeter, the fee conversion adaptor 99 converts the digital information service fee data into analog data which are applied to the integrating wattmeter 100 to control it. More specifically, the information service fee output in a digital form are converted into a current, corresponding to the power consumption equivalent to the information service fee using the number of revolutions of the aluminum disk as a parameter, and then the resulting current is applied to the integrating wattmeter 100. The information service fee determined in the terminal unit is thus sent, in the form of current, to the integrating wattmeter. The wattmeter therefore indicates the total watthour, and consequently a utility company bills and collects the integrated fee including the information service fee. This embodiment adopts a known system in which the utility company pays to the information provider the amount with the actual electricity rate plus agent service charge deducted. The host station preferably transmits the fee conversion data to each terminal unit in synchronism with billing time or meter reading time. In summary, in this embodiment the information service fee is determined based on the type of information provided, and the total information service fee for a predetermined period of time is converted into watthour amount, and the current value corresponding to it is sent to the integrating watthour meter.

In the fourth embodiment, the fee conversion adaptor 99 converts the information service fee into a current which can be directly convertible to watthour amount. The fee conversion adaptor 99 applies the resulting current to the AC integrating wattmeter 100. To achieve an improved efficiency in billing, however, information service fee may be supplied to an integrating meter of other utilities service than electricity.

Figure 10:
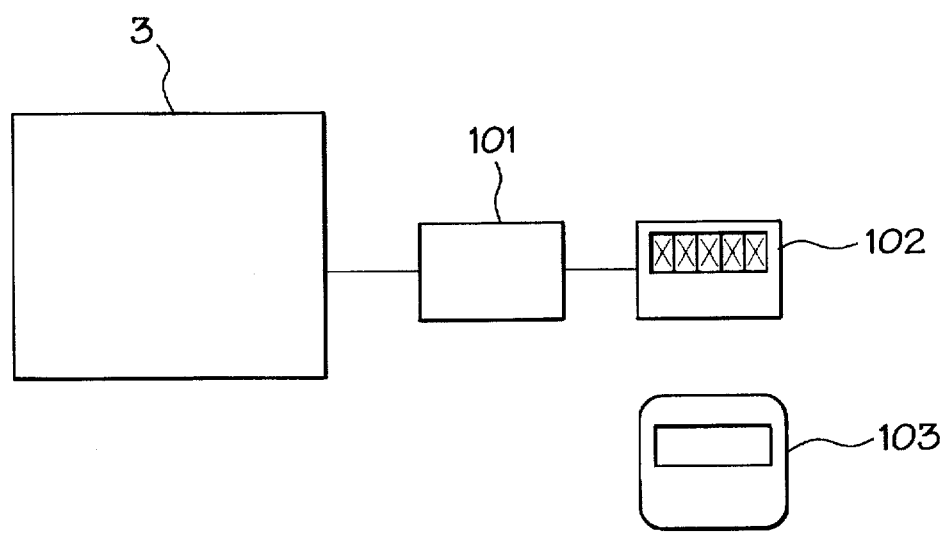
FIG. 10 is a block diagram showing an alternative to the fourth embodiment of the present invention.

FIG. 10 shows an alternative embodiment to the fourth embodiment, wherein a digital integrating meter, replacing an analog integrating meter, indicates the utility rate of any one of electricity, gas and water supplies, and the information service fee is supplied to the digital integrating meter. Shown in FIG. 10 are a fee conversion adaptor 101, a digital integrating meter 102 and an analog integrating meter which indicates the utility rate of any one of electricity, gas and water supplies. The terminal unit 3, which is used to provide information service and then indicates service fee involved, is identical to the one used in the fourth embodiment where the AC watthour meter 100 is employed. The fee conversion adaptor 101, connected to the digital integrating meter 102, converts the information service fee into a digital signal equivalent to any one of the consumed amounts of watthour, gas volume and water volume, depending on the type of utilities service the meter is intended for. Namely, the fee conversion adaptor 101 converts the information service fee into the amount compatible with the integrating meter 102 in use, and controls the integrating meter 102. If an already existing analog integrating meter 103 is used in parallel, billing operation is performed according to the frequency of utilization.

In this embodiment, the information service fee is converted into data compatible with the integrating meter of a public utilities service, typically electricity, gas or water supply, and each utility company bills and collects the total fee. The user therefore may get information service without altering the payment method for the conventional utilities service. The information provider benefits from improved fee collection rate.

Figure 11:
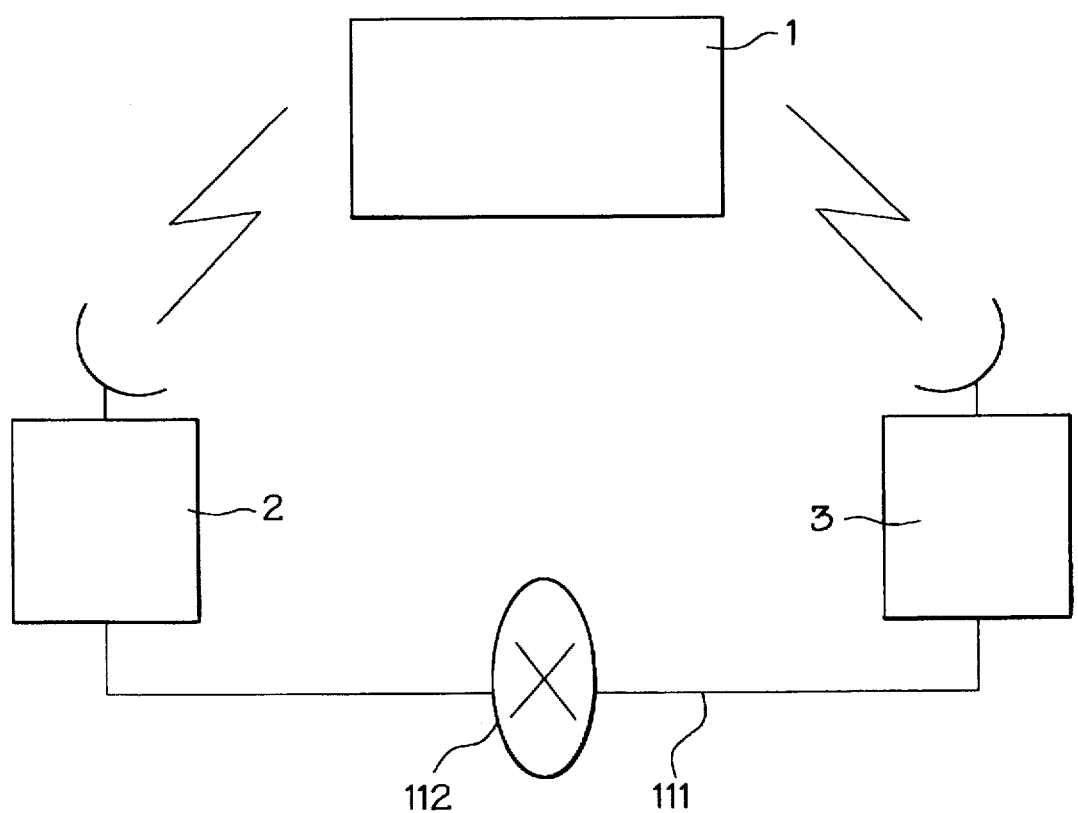
FIG. 11 is a block diagram showing generally the entire system according to the fifth embodiment of the present invention.
Figure 12:
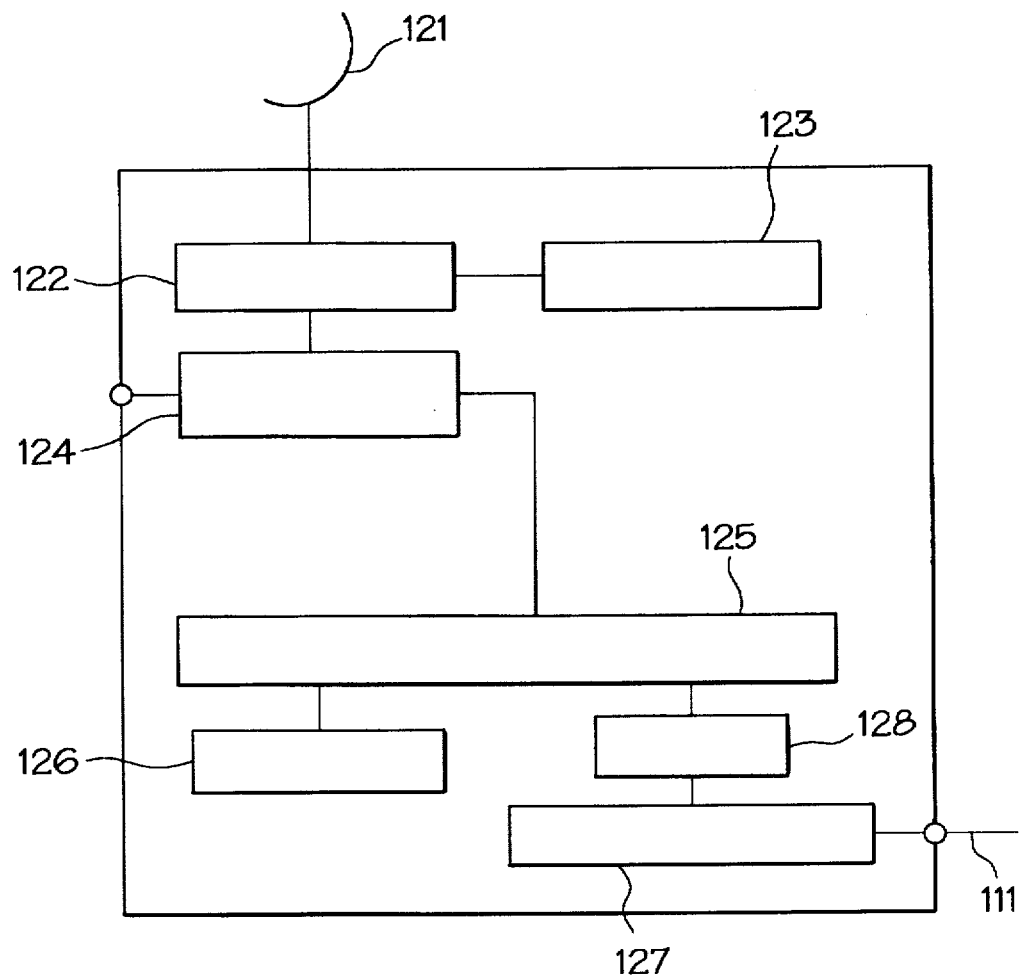
FIG. 12 is a block diagram showing the terminal unit of the system of FIG. 11.

The fourth embodiment presents the system in which the information service fee is added onto the public utilities rates. The fifth embodiment presents the system in which a public utilities rate only is efficiently billed and collected. FIG. 11 is a block diagram showing the entire system. Shown in the figure are a communications satellite 1, a main unit 2 at the transmitter side, and a terminal unit 3 at the receiver side, and these are identical to those already described in the preceding embodiments. Also shown are a telephone line 111 and a telephone network 112, and the telephone line 11 serves as a communications link between the main unit 2 and the terminal unit 3. The main unit 2 has the configuration identical to that of the first embodiment shown in FIG. 2. The main unit 2 transmits a control signal to the terminal unit 3 via the communications satellite 1. The control signal essentially contains a command for causing the terminal unit 3 to upload the utilization status data stored to the main unit 2. No particular requirements, for example, on signal specifications, are imposed on the control signal. When there are a large number of subscribers, the control signal is preferably a digital form. Referring to FIG. 12, the internal structure of the terminal unit 3 is detailed below. A tuner 122 receives via a receiving antenna 121 satellite signal, namely the control signal, which is derived from the main unit 2. At the option in the system is the use of the tuner type 122 that is capable of receiving not only the control signal, namely text data, but also general-natured signal such as music and image. The use of such a tuner type does not make any difference in the context of the present invention. A received data processing block 123, having a buffer memory, performs essential processing such as saving temporarily each data the tuner 122 has processed, and organizing data streams, such as headers and footers, which are used for communication in order to extract required information only. A digital integrating meter 124 indicates a consumed amount of public utilities service, that is, consumed watthour for electricity, consumed gas volume for gas supply, or consumed water volume for water supply. The digital integrating meter 124 counts the consumed amount in a digital form as utilization data. A CPU 125 controls the entire terminal unit 3. The utilization data counted by the digital integrating meter 124 is stored onto a RAM memory 126 through the CPU 125. The utilization data stored in the RAM 126 are transferred to the main unit 2 via a modem 127 and then the telephone line 111.

In the fifth embodiment, when the terminal unit 3 receives the control signal which the main unit 2 transmits at regular intervals, the telephone number of a subscriber (user) in its coded form is added to the utilization data which is stored in the RAM 126 in the terminal unit 3. Resulting data are output from the modem 127, and transmitted to the main unit 2 via the telephone line 111. Since radio communications are generally of broadcasting nature, the control signal derived from the main unit is simultaneously received by all the subscribers through satellite link. In practice, however, many terminal units are connected to the transmitter side 2 over the telephone line. If all the subscribers attempt to access the main unit 2 simultaneously to transfer data to the main unit 2, a line busy state occurs frequently, degrading traffic of the line. To avoid this, the assignment of dedicated line or particular frequencies to subscribers is contemplated. But such a scheme is not only uneconomical but also infeasible in reality when a large number of subscribers are handled. In view of this difficulty, this embodiment allows each terminal unit 3 to contain a delay processing means 128 with different delay time width. A unit of delay time width is set to the duration from the moment the terminal unit 3 accesses the main unit 2 via the telephone line 111, followed by the upload of the utilization data to the main unit 2, to the moment the line is disconnected. A plurality of terminal units 3 are provided with different time widths in steps of unit delay time width. This prevents line busy when the main unit 2 is called simultaneously. The main unit 2 normally possesses a plurality of lines, and, depending on the number of lines, the terminal units may be grouped. In each group of terminal units, delay processing is performed. Several delay processing means are contemplated as follows: a delay is provided by routing data output from the CPU 125 through a delay buffer to the modem; a delay is provided by altering an arithmetic expression for the internal clock of the CPU 125. Selection of delay means is at the option. Once the utilization data are thus transferred to the main unit 2, the main unit 2 identifies each telephone number, and calculates the utilities rate for each terminal unit 3. The main unit 2 has an internal database in the form of data table indicating unit price for each utilities service. When the main unit 2 receives data, the main unit 2 refers the data to the data table, and calculates the sum. The utilities rate is thus calculated, the consumer is billed using any proper means.

In this embodiment, a single type of public utilities service is handled. If the digital integrating meter 124 is capable of handling a plurality of types in parallel and if the RAM 126 stores the public utilities rates on a per type basis, the control signal can specify the type of service to allow the terminal unit to upload arbitrarily selected utilization data to the main unit. The transmitter side thus functions as a public utilities rate management system. Once such a system is established, a subscriber who is equipped with a terminal unit needs no modification in the existing public utilities service payment method. The host station can thus perform billing and collecting operation in a timely and smooth manner. Thus, an efficient public utilities rate billing system results.

What is claimed is:

1. A billing system in radio communications comprising:
   a main unit having a host computer with a database for storing data of various types and a transceiver for transmitting and receiving said data of various types via radio communications, and
   a plurality of terminal units for receiving said data of various types, each of said terminal units having a unique terminal identification code,
   said main unit being configured to add to data to be transmitted a data identification code unique to said data type of said data to be transmitted, and said main unit being configured to transmit said data with said data identification code,
   said main unit being further configured to transmit at regular intervals a control signal to request transfer of utilization information, and
   each of said plurality of terminal units including a processor for sequentially storing the data identification codes of said data transmitted from said main unit and received by said terminal unit, and, upon receiving said control signal, for forming a data stream comprising said stored data identification codes and said terminal identification code corresponding to said terminal unit.

2. The billing system in radio communications according to claim 1 wherein said terminal unit is further provided with a transmitter for transmission to the main unit.

3. The billing system in radio communications according to claim 1, wherein said radio communications are terrestrial communications.

4. The billing system in radio communications according to claim 1, wherein an example of said data of various types is data containing a program required for executing a computer video game.

5. The billing system in radio communications according to claim 1, wherein transmitted signal from said main unit is scrambled, and said terminal unit is provided with a descrambler.

6. The billing system in radio communications according to claim 1, wherein said main unit is configured to store pricing data on a per data type basis in a data table, and is configured to calculate an information service fee per each terminal unit by referring said data streams transmitted from said terminal unit to said data table.

7. The billing system in radio communications according to claim 1, wherein said terminal unit is configured to store pricing data on a per data type basis in a data table, is configured to calculate an information service fee by referring those of said stored data identification codes which were stored prior to the reception of said control signal to said data table, and is configured to send said information service fee as data to said main unit.

8. The billing system in radio communications according to claim 1, wherein a mode of propagation for the transmission is FM modulation, and said terminal unit comprises a digital signal processing block which converts received signal into a digital signal.

9. The billing system in radio communications according to claim 1, wherein said data identification code comprises two kinds of pricing information, namely, pricing information on a per unit data basis and pricing information on a per unit time basis, and billing is selectively made by unit data or by unit time in accordance with the data executed by said terminal unit.

10. A billing system in radio communications comprising:

a main unit having a host computer with a database for storing data of various types and a transceiver for transmitting and receiving said data of various types via radio communications;

a plurality of terminal units for receiving said data of various types, each of said terminal units having a unique terminal identification code;

said main unit being configured to add to data to be transmitted a data identification code unique to said data type of said data to be transmitted, and said main unit being configured to transmit said data with said data identification code;

said main unit being further configured to transmit at regular intervals a control signal to request transfer of utilization information; and each of said plurality of terminal units including a processor for sequentially storing the data identification codes of said data transmitted from said main unit and received by said terminal unit, and, upon receiving said control signal, for forming a data stream comprising said stored data identification codes and said terminal identification code corresponding to said terminal unit, wherein said radio communications are satellite communications.

* * * * *